United States Patent [19]

Lengyel et al.

[11] Patent Number: 4,754,581
[45] Date of Patent: Jul. 5, 1988

[54] CLOSE-CAPTURE TRAVELLING HOOD FOR TRAVELLING HARDWHEEL GRINDER

[75] Inventors: Nicholas M. Lengyel, Steubenville; Dale E. Hewitt, Wintersville, both of Ohio

[73] Assignee: Titanium Metals Corporation of America (TIMET), Pittsburgh, Pa.

[21] Appl. No.: 934,959

[22] Filed: Nov. 26, 1986

[51] Int. Cl.⁴ .................. B24B 55/04; B24C 9/00
[52] U.S. Cl. ................................. 51/268; 51/426; 51/270; 51/272
[58] Field of Search ........... 51/268, 270, 272, 273, 51/423

[56] References Cited

U.S. PATENT DOCUMENTS

| | | | |
|---|---|---|---|
| 1,977,386 | 10/1934 | Holes | 51/270 X |
| 4,068,648 | 1/1978 | Erdman | 51/270 X |
| 4,382,352 | 5/1983 | Nelson | 51/424 |

Primary Examiner—Frederick R. Schmidt
Assistant Examiner—Maurina Rachuba
Attorney, Agent, or Firm—Finnegan, Henderson, Farabow, Garrett & Dunner

[57] ABSTRACT

A grinding machine has a grinder and a grinding hood for confining and collecting fumes and grinding swarf from the workpiece.

4 Claims, 3 Drawing Sheets

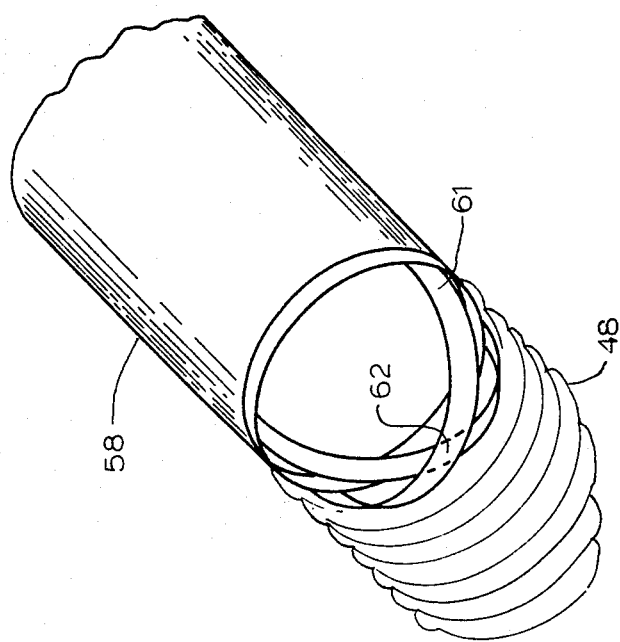

CLOSE-CAPTURE TRAVELLING HOOD FOR TRAVELLING HARDWHEEL GRINDER

BACKGROUND OF THE INVENTION

The invention relates to apparatus for surface grinding of metal and alloy workpieces, particularly titanium and titanium-base alloy workpieces such as slabs and billets.

In the production of titanium, including titanium alloy, workpieces such as slabs and billets it is necessary to condition the surface of the workpiece for removal of surface defects prior to further processing of the workpieces. This is conventionally achieved by a surface grinding operation. In typical operations of this type, a grinding wheel is used to either grind a substantially uniform layer from the entire surface of the workpiece or in the alternative surface defects are located, marked and then selectively removed by grinding. With titanium workpieces, because of the pyrophoric nature thereof, excessive amounts of smoke or fumes are produced during surface grinding. To prevent contamination of the grinding area, it is necessary that these fumes be removed as grinding proceeds.

With grinding operations of this type, the grinding wheel performing the grinding function is brought into contact with the workpiece surface and is directed to traverse the surface in oscillating fashion until the grinding operation is completed. In operations of this type, it is known to cover the workpiece during grinding with a stationary hood with the hood being connected through ductwork and an exhaust fan for removing the fumes from the hood to a discharge area, typically a bag-house. Since the workpieces being conditioned are relatively large, stationary hoods must be correspondingly large. This results in a large volume of air, typically 35,000 cfm to 50,000 cfm, to be exhausted by the exhaust system. This in turn requires large-capacity bag-houses for collection and also high capacity motors and fans for withdrawing the fumes.

It is also known to use hoods that travel or oscillate with the grinder during the surface grinding operation. These hoods provide difficulty, however, with respect to effective connection of the duct for discharge of the fumes to the location apart from the hood. To permit movement of the duct with the hood it is typical to connect the end of the duct opposite the end connected to the hood to a fixed, elongated conduit by means of an open connection with the end of the duct sliding along the conduit at the open connection. This results in leakage of the fumes at the open connection. Also, with travelling hoods of this type if they are designed for minimum interior volume to in turn minimize the needed capacity of the duct and exhaust system the swarf produced during the grinding operation causes rapid deterioration of the hood. Specifically, during grinding of titanium workpieces a large amount of high-temperature swarf is removed which swarf travels at high velocity and in typical fashion impinges against the interior portions of the hood to result in rapid deterioration thereof. Also, with conventional systems this swarf collects within the hood and thus requires a hood drive of sufficient capacity to move not only the hood with the grinder but also the swarf collected within the hood. In addition, with conventional systems the swarf is removed from the hood by the exhaust system and passes through the conduit to the bag-house. The swarf is at a temperature of approximately 3,000° F. and if exhausted with the fumes may ignite in the ductwork or the bag-house. In addition, such requires a large bag-house capacity to collect the relatively large swarf particles along with the fumes.

OBJECTS OF THE INVENTION

It is accordingly a primary object of the present invention to provide a travelling grinder and associated travelling hood adapted particularly to the grinding of titanium that provides improvement over prior art stationary and travelling hoods used for this purpose.

A more specific object in the invention is to provide a grinding apparatus of this type wherein the duct connecting the travelling hood to the discharge location, such as a bag-house, may be fixedly connected at both ends to eliminate the escape of fumes from the conduit during passage from the hood to the bag-house.

Another object of the invention is to provide a travelling hood of this type for use with a surface grinder wherein deterioration of the hood structure resulting from contact with the high-temperature grinding swarf is minimized.

Yet another object of the invention is to provide a travelling hood for use with surface grinding apparatus in the grinding of titanium workpieces wherein the discharge of grinding swarf into the duct for removing the fumes is minimized to in turn reduce the needed exhaust apparatus capacity and bag-house capacity while limiting the jeopardy of igniting of the bag-house by the high-temperature swarf and therefore eliminating the need for expensive fire protection and explosion protection devices.

Still another object of the invention is to provide a travelling hood for use with grinding apparatus for the surface grinding of titanium workpieces wherein the grinding swarf is separated from the fumes so that the fumes are discharged into the duct and the grinding swarf drops from the hood for collection.

SUMMARY OF THE INVENTION

In accordance with the invention there is provided apparatus for the surface grinding of metal workpieces with the apparatus including a grinder adapted for movement along and simultaneous surface grinding of a surface of a metal workpiece. The term metal workpiece is intended to include metals as well as metal alloys. A hood is provided for corresponding movement with the grinder and for confining and collecting fumes and grinding swarf from the workpiece during the surface grinding operation. Also, duct means for removing these fumes from the hood and directing and discharging the fumes at a discharge location apart from the hood is provided. The duct means includes a flexible conduit having a first fixed connection at one end to an interior portion of the hood and a second fixed connection at an opposite end to the discharge location. Support means are connected to the conduit intermediate the ends thereof for supporting the conduit during travel of the grinder and hood. The support includes a guide and a connector fastened to the conduit and adapted for movement along the guide. The support is pivotally fastened to the conduit whereby the conduit is adapted for transverse and pivotal movement along with the associated movement of the grinder and hood. Adjacent the support the conduit includes reinforcement means for preventing crimping of the conduit at the support during movement of the conduit. In addition, the conduit has adjacent at least one end thereof internal bracing for preventing interior restriction of the conduit during twisting and bending thereof incident to movement corresponding to the travel of the grinder and hood associated with the conduit.

The hood, which is adapted for corresponding movement with the grinder and for confining and collecting fumes and grinding swarf, includes a movable support. This movable support is mounted for movement along a guide rail extending generally parallel to the movement of the grinder during surface grinding of the workpiece. The hood further includes a grinding chamber for housing a surface grinding element of the grinder and a portion of the workpiece during grinding. It also includes a swarf collection chamber having an opening into the grinding chamber through which grinding swarf from the workpiece during grinding is introduced to the swarf collection chamber. A swarf-deflection plate is freely suspended within the swarf collection chamber and the grinding swarf is directed onto this plate. The swarf deflection plate deflects and collects swarf introduced thereto so that the grinding swarf is prevented from entering the duct. The swarf collection chamber has a vent connected to the duct through which the fumes leave the swarf collection chamber. The swarf collection chamber also has a bottom outlet though which the grinding swarf is deflected by the swarf-deflection plate and leaves the swarf collection chamber. The grinding chamber and swarf collection chamber of the hood are separated by a plurality of baffle plates defining an opening. The opening is aligned with the swarf deflection plate for directing grinding swarf from the grinding element to the swarf deflection plate. The opening defined by the baffle plates also serves to confine fumes within the swarf collection chamber. The bottom outlet and the vent of the swarf collection chamber are positioned relative to the swarf deflection plate to produce a flow-path of air along a surface of the swarf deflection plate opposite that onto which the grinding swarf is directed. This serves to cool the swarf collection plate and thereby minimize deterioration of the plate caused by the contact with the high-temperature grinding swarf.

The interior portion of the hood is constructed to limit outside-air volume during surface grinding to a maximum of 12,000 cfm.

BRIEF DESCRIPTION OF THE DRAWINGS

FIG. 3 is a detailed view showing the internal support structure for the flexible conduit of the apparatus.

The accompanying drawings, which are incorporated in and constitute a part of this specification, illustrate an embodiment of the invention and, together with the description, serve to explain the principles of the invention.

DESCRIPTION OF THE PREFERRED EMBODIMENT

Figure 1:
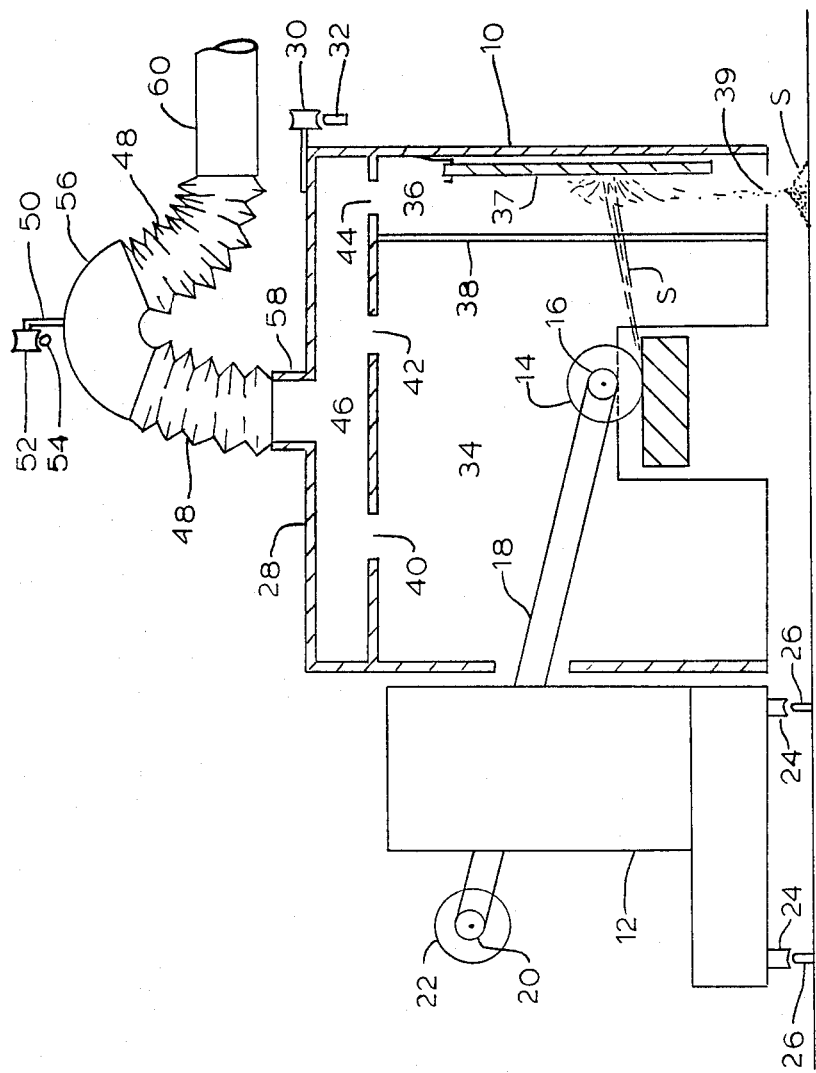
FIG. 1 is an elevation view in partial section of the grinder, hood and duct in accordance with one embodiment of the apparatus of the invention.
Figure 2:
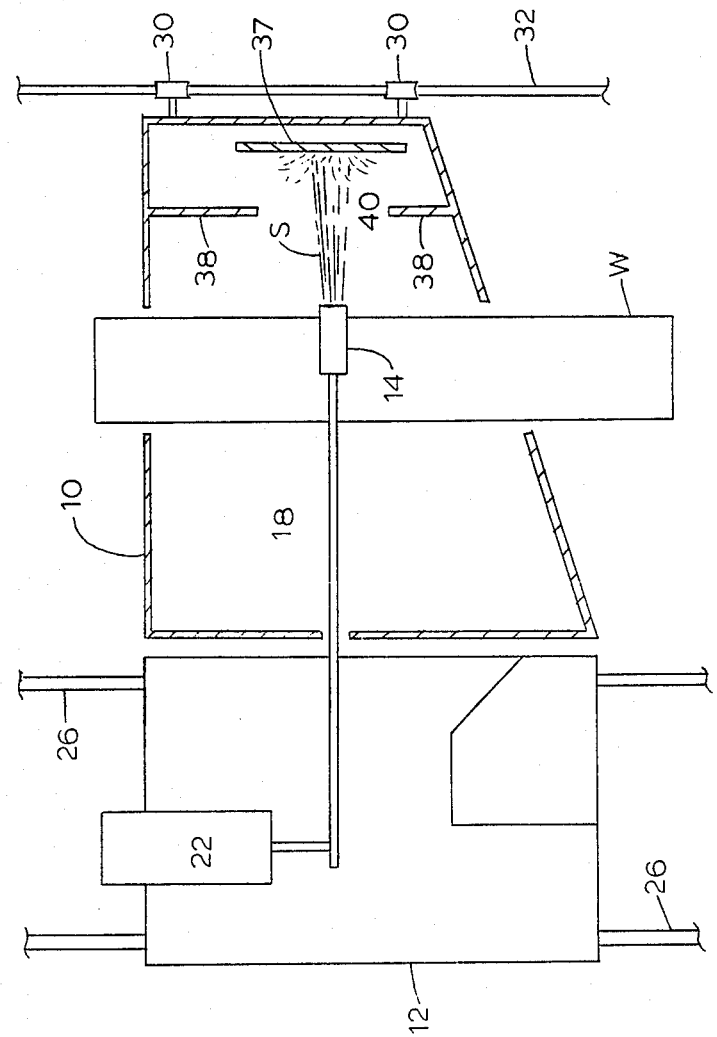
FIG. 2 is a horizontal sectional view of the apparatus of FIG. 1.

With reference to the drawings, and for the present to FIGS. 1 and 2 thereof, there is shown a grinding apparatus designated generally as 10. The apparatus includes a conventional surface grinder 12 having a grinding wheel 14 journaled for rotation on a shaft 16 and driven by a continuous belt 18 by drive shaft 20 connected to motor 22. The grinder 12 is adapted for travel by means of wheels 24 adapted for movement along rails 26.

Associated with the grinder 12 is a movable or travelling hood 28. The hood 28 has wheels 30 for supporting the hood 28 for travelling movement with the grinder along guiderail 32. The hood 28 is adapted to confine the grinding wheel 14 and the portion of the work piece to be conditioned by the grinding operation, which workpiece is designated as W.

The hood is divided into a grinding chamber 34 and a swarf collection chamber 36 having a bottom opening 39. Chamber 36 has a freely supported target plate or swarf-deflection plate 37 suspended therein. These chambers are defined and separated by baffle plates 38 defining an opening 40 between the two chambers 34 and 36. Chamber 34 is provided with vents 40 and 42. Chamber 36 is provided with vent 44. These vents 40, 42 and 44 open into a fume collection chamber 46. The chamber 46 extends along the upper interior of hood 28 and is connected to a flexible conduit 48 having a movable support 50 intermediate the ends thereof. The support 50 includes a wheel 52 adapted to travel along a cable 54. The flexible conduit 48 has a reinforced portion, which may be of metal construction designated as 56 adjacent the connection 50. It also has reinforced, metal end portions 58 and 60. The end portion 58 is connected to the fume collection chamber 46 and the end 60 is connected to the bag-house (not shown). At the connection of flexible conduit 48 with the end reinforcement portions 58 and 60, as shown in FIG. 3, internal bracing in the form of steel bars 61 connected as at 62 to form a supporting framework within the flexible conduit 48 may be provided. This prevents crimping of the flexible conduit 48 at the connection to portions 58 and 60.

The grinding operation to surface condition the workpiece W is performed in the conventional manner by moving the grinder 12 in oscillating fashion along the track 26 so that the grinding wheel 14 is brought into grinding contact until the desired defects are removed or alternately until a continuous surface portion of the workpiece is removed. During this grinding operation swarf, designated as S in the form of particles of the metal removed incident to the grinding operation, are directed through the opening 40 and from the grinding chamber to the swarf collection chamber 36. This swarf impinges against a freely supported target plate or swarf-deflection plate 37 within the chamber 36. This plate is supported freely by means not shown within the chamber 36 so that when it is contacted by the high-temperature swarf the swarf is deflected by the plate and leaves the chamber through the bottom. It may thus be readily collected and in this manner is not required to be carried along with the hood during movement thereof with the grinder. Since the plate 37 is freely suspended, during heating thereof incident to the impingement of the high-temperature swarf thereon the plate tends to warp and contort in a fashion that continuously removes from the plate swarf particles that may solidify and collect thereon. In this manner the plate is adapted for extended use. It serves not only to deflect the swarf from the grinding operation for collection outside the hood, but in addition protects the structure of the hood from deterioration caused by the high-temperature swarf. Since the swarf is directed onto the plate 37 it does not come into substantial contact with the remainder of the hood structure. This, of course, serves to prolong the useful life of the hood. The baffles 38 prevent the fumes that enter the chamber 36 with the swarf incident to the grinding operation from exhausting into the grinding chamber 34 of the hood. Instead, the fumes leave the chamber 36 through vent 44, pass into the chamber 46 and are exhausted therefrom through duct 48 and then to the bag-house for collection of particles entrained therein. The vents 40 and 42 in the chamber 34 permit escape of fumes emitted from the rear portion of the grinding wheel or the portion thereof opposite the direction of swarf travel. These fumes likewise pass into the conduit 48 for transport to and collection at the bag-house.

With the structure shown and described in accordance with this embodiment of the invention the duct means constituting flexible conduit 48 may be fixedly connected both to the travelling hood and the bag-house so that escape of fumes from the conduit is avoided. With the conduit being flexible it may move by means of the movable connection 50 along the cable 54 with the corresponding movement of the travelling hood without requiring movement at the connected ends connected to the hood and bag house.

The hood by the use of structure defining a fume collection chamber 36 and associated target plate 37 provides for separation of the swarf and fumes with the swarf being deflected out of the bottom of the hood and the fumes leaving the chamber and being exhausted to the bag-house through the duct arrangement. In this manner the problems associated with the swarf leaving with the fumes characterizing prior-art devices is avoided. In addition, the plate 37 also minimizes deterioration of the hood structure resulting from contact with the high-temperature grinding swarf. The baffle arrangement constituting the separation between the grinding chamber and the collecting chamber permits efficient removal of the fumes by preventing them from propagating into the grinding chamber but instead providing direct removal through the vent 44 at the top of the collecting chamber. In this manner, the combination of effective fume removal while maintaining the interior portion of the hood to a size that limits outside air volume to a maximum of 12,000 cfm is achievable. This of course improves the efficiency of the operation by limiting the required capacity of the exhaust equipment, including the fan and motor, and also limiting bag-house capacity. With this arrangement it is possible to use a single fan of conventional capacity with four grinders; whereas, with prior-art devices a single fan of the same capacity was necessary for use with each single grinder.

What is claimed is:

1. Apparatus for the surface grinding of metal workpieces, said apparatus comprising a grinder adapted for movement along and simultaneous surface grinding of a surface of a metal workpiece, a hood adapted for corresponding movement with said grinder during surface grinding and for confining and collecting fumes and grinding swarf from said workpiece during said surface grinding and duct means for removing said fumes from said hood and directing and discharging said fumes to a discharge location apart from said hood, said hood including a movable support, said movable support being mounted for movement along a guide rail extending generally parallel to movement of said grinder during surface grinding of said workpiece, said hood further including a grinder chamber for housing a surface grinding element of said grinder and said workpiece during grinding thereof and a swarf collection chamber having an opening into said grinder chamber through which grinding swarf from said workpiece during grinding thereof is introduced to said swarf collection chamber, a swarf-deflection plate freely suspended within said swarf collection chamber and onto which grinding swarf is directed during grinding of said workpiece, said swarf deflection plate deflecting and collecting swarf introduced thereto, whereby grinding swarf is prevented from entering said duct means, a vent in said swarf collection chamber connected to said duct means through which fumes leave said swarf collection chamber, and a bottom outlet in said swarf collection chamber through which grinding swarf is deflected by said swarf-deflection plate and leaves said swarf collection chamber, with said bottom outlet and said vent being positioned relative to said swarf reflection plate to produce a flow-path of air along a surface of said swarf reflection plate opposite a surface onto which said grinding swarf is directed to cool said swarf deflection plate.

2. The apparatus of claim 1 wherein said grinder chamber and said swarf collection chamber are separated by a plurality of baffle plates defining said opening, with said opening being aligned with said swarf deflection plate for directing grinding swarf from said grinding element to said swarf deflection plate and confining fumes within said swarf collection chamber.

3. Apparatus for the surface grinding of metal workpieces, said apparatus comprising a grinder adapted for movement along and simultaneous surface grinding of a surface of a metal workpiece, a hood adapted for corresponding movement with said surface grinder during surface grinding and for confining and deflecting fumes and grinding swarf from said workpiece during said surface grinding and duct means for removing said fumes from said hood and directing and discharging said fumes at a discharge location apart from said hood, said duct means including a flexible conduit having a first fixed connection at one end to an interior portion of said hood and a second fixed connection at an opposite end to said discharge location, support means connected to said conduit intermediate said ends thereof for supporting said conduit during travel of said grinder and said hood, with said support means including a guide and a connector fastened to said conduit and adapted for movement along said guide, said hood including a movable support, said movable support being mounted for movement along a guide rail extending generally parallel to movement of said grinder during surface grinding of said workpiece, said hood further including a grinder chamber for housing a surface grinding element of said grinder and a portion of said workpiece during grinding thereof, a swarf collection chamber having an opening into said grinder chamber into which grinding swarf from said workpiece during grinding thereof is introduced to said swarf collection chamber, a swarf-deflecting plate freely suspended within said swarf collecting chamber and onto which grinding swarf is directed during grinding of said workpiece, said swarf deflecting plate deflecting and collecting swarf introduced thereto, whereby grinding swarf is prevented from entering said duct means, a vent in said swarf collection chamber connected to said duct means through which fumes leave said swarf collection chamber, a bottom outlet in said swarf collection chamber through which grinding swarf is deflected by said swarf deflection plate and leaves said swarf collection chamber, said grinding chamber and said swarf collection chamber being separated by a plurality of baffle plates defining said opening into said grinding chamber, with said opening being aligned with said swarf deflection plate for deflecting grinding swarf from said grinding element to said swarf deflection plate and confining fumes with said swarf collection chamber and said bottom outlet, and said vent being positioned relative to said swarf deflection plate to produce a flow-path of air along a surface of said swarf reflection plate opposite a surface onto which said grinding swarf is directed to cool said swarf deflection plate.

4. The apparatus of claim 3 wherein during said surface grinding said hood limits outside-air volume to a maximum of 12,000 cfm.

* * * * *